US010268641B1

(12) United States Patent
Guha

(10) Patent No.: US 10,268,641 B1
(45) Date of Patent: Apr. 23, 2019

(54) SEARCH RESULT RANKING BASED ON TRUST

(71) Applicant: Google LLC, Mountain View, CA (US)

(72) Inventor: Ramanathan V. Guha, Los Altos, CA (US)

(73) Assignee: Google LLC, Mountain View, CA (US)

( * ) Notice: Subject to any disclaimer, the term of this patent is extended or adjusted under 35 U.S.C. 154(b) by 157 days.

(21) Appl. No.: 14/445,209

(22) Filed: Jul. 29, 2014

Related U.S. Application Data

(63) Continuation of application No. 13/614,339, filed on Sep. 13, 2012, now Pat. No. 8,818,995, which is a continuation of application No. 12/552,956, filed on Sep. 2, 2009, now Pat. No. 8,352,467, which is a continuation of application No. 11/382,449, filed on May 9, 2006, now Pat. No. 7,603,350.

(51) Int. Cl.
  *G06F 17/30* (2006.01)
  *G06F 16/2457* (2019.01)
  *G06F 16/951* (2019.01)

(52) U.S. Cl.
  CPC ...... *G06F 16/24578* (2019.01); *G06F 16/951* (2019.01)

(58) Field of Classification Search
  CPC .................. G06F 17/3053; G06F 17/30864
  See application file for complete search history.

(56) References Cited

U.S. PATENT DOCUMENTS

| | | | |
|---|---|---|---|
| 5,659,616 A | 8/1997 | Sudia | |
| 5,825,880 A | 10/1998 | Sudia | |
| 5,867,578 A | 2/1999 | Brickell | |
| 5,892,824 A | 4/1999 | Beatson | |
| 6,064,751 A | 5/2000 | Smithies | |
| 6,167,518 A | 12/2000 | Padgett | |
| 6,260,064 B1 | 7/2001 | Kurzrok | |
| 6,285,999 B1 | 9/2001 | Page | |
| 6,334,131 B2 | 12/2001 | Chakrabarti | |

(Continued)

FOREIGN PATENT DOCUMENTS

| | | |
|---|---|---|
| EP | 1363208 A3 | 4/2006 |
| WO | WO2000062220 A1 | 10/2000 |
| WO | WO2004088475 A1 | 10/2004 |

OTHER PUBLICATIONS

'XML-Signature Syntax and Processing', [online]. Bartel et al., 2002 [retrieved on May 24, 2006]. Retrieved from the Internet: < URL: www.w3.org/TR/xmldsig-core/>, 60 pages.

(Continued)

*Primary Examiner* — James Trujillo
*Assistant Examiner* — Kurt A Mueller
(74) *Attorney, Agent, or Firm* — Fish & Richardson P.C.

(57) ABSTRACT

A search engine system provides search results that are ranked according to a measure of the trust associated with entities that have provided labels for the documents in the search results. A search engine receives a query and selects documents relevant to the query. The search engine also determines labels associated with selected documents, and the trust ranks of the entities that provided the labels. The trust ranks are used to determine trust factors for the respective documents. The trust factors are used to adjust information retrieval scores of the documents. The search results are then ranked based on the adjusted information retrieval scores.

20 Claims, 3 Drawing Sheets

(56) References Cited

U.S. PATENT DOCUMENTS

| | | |
|---|---|---|
| 6,336,117 B1 | 1/2002 | Massarani |
| 6,356,924 B2 | 3/2002 | Mullen |
| 6,360,215 B1 | 3/2002 | Judd |
| 6,381,344 B1 | 4/2002 | Smithies |
| 6,421,675 B1 | 7/2002 | Ryan |
| 6,636,854 B2 | 10/2003 | Dutta |
| 6,742,030 B1 | 5/2004 | MacPhail |
| 6,760,752 B1 | 7/2004 | Liu |
| 6,871,191 B1 | 3/2005 | Kinney |
| 7,013,323 B1 | 3/2006 | Thomas |
| 7,031,961 B2 | 4/2006 | Pitkow |
| 7,047,241 B1 | 5/2006 | Erickson |
| 7,185,065 B1 | 2/2007 | Holtzman |
| 7,370,036 B2 | 5/2008 | Vedula |
| 7,505,961 B2 | 3/2009 | Finger |
| 7,603,350 B1 | 10/2009 | Guha |
| 7,664,669 B1* | 2/2010 | Adams ............... G06Q 10/10 705/7.32 |
| 7,805,518 B1 | 9/2010 | Kamvar |
| 7,822,631 B1* | 10/2010 | Vander Mey ..... G06F 17/30038 705/7.29 |
| 8,090,717 B1 | 1/2012 | Bharat |
| 8,185,523 B2 | 5/2012 | Lu |
| 8,352,467 B1 | 1/2013 | Guha |
| 2001/0002485 A1 | 5/2001 | Bisbee |
| 2002/0052928 A1 | 5/2002 | Stern |
| 2002/0062368 A1 | 5/2002 | Holtzman |
| 2002/0124172 A1 | 9/2002 | Manahan |
| 2002/0143755 A1 | 10/2002 | Wynblatt |
| 2002/0169865 A1 | 11/2002 | Tarnoff |
| 2002/0184333 A1 | 12/2002 | Appelman |
| 2003/0009461 A1 | 1/2003 | Notargiacomo |
| 2003/0046366 A1 | 3/2003 | Pardikar |
| 2003/0050919 A1 | 3/2003 | Brown |
| 2003/0051142 A1 | 3/2003 | Hidalgo |
| 2003/0115151 A1 | 6/2003 | Wheeler |
| 2003/0126245 A1 | 7/2003 | Feltin |
| 2003/0172120 A1 | 9/2003 | Tomkow |
| 2003/0182421 A1 | 9/2003 | Faybishenko |
| 2003/0212862 A1 | 11/2003 | James |
| 2003/0233345 A1 | 12/2003 | Perisic |
| 2004/0019546 A1 | 1/2004 | Ta |
| 2004/0078750 A1 | 4/2004 | Frank |
| 2004/0181756 A1 | 9/2004 | Berringer |
| 2004/0205076 A1 | 10/2004 | Huang |
| 2004/0205513 A1 | 10/2004 | Chen |
| 2004/0255115 A1 | 12/2004 | DeMello |
| 2005/0033747 A1 | 2/2005 | Wittkotter |
| 2005/0044197 A1 | 2/2005 | Lai |
| 2005/0050066 A1 | 3/2005 | Hughes |
| 2005/0060312 A1 | 3/2005 | Curtiss |
| 2005/0065924 A1 | 3/2005 | Silverbrook |
| 2005/0086260 A1 | 4/2005 | Canright |
| 2005/0160363 A1 | 7/2005 | Bhogal |
| 2005/0177389 A1 | 8/2005 | Rakowicz |
| 2005/0210114 A1 | 9/2005 | Washburn |
| 2005/0256866 A1 | 11/2005 | Lu |
| 2006/0004628 A1 | 1/2006 | Axe |
| 2006/0015488 A1 | 1/2006 | Perisic |
| 2006/0020596 A1 | 1/2006 | Liu |
| 2006/0026140 A1 | 2/2006 | King |
| 2006/0026147 A1 | 2/2006 | Cone |
| 2006/0031235 A1 | 2/2006 | Foresti |
| 2006/0036599 A1 | 2/2006 | Glaser |
| 2006/0112105 A1 | 5/2006 | Adamic |
| 2006/0112165 A9 | 5/2006 | Tomkow |
| 2006/0167784 A1 | 7/2006 | Hoffberg |
| 2006/0168057 A1 | 7/2006 | Warren |
| 2006/0173867 A1 | 8/2006 | Gaucas |
| 2006/0179320 A1 | 8/2006 | Berringer |
| 2006/0184452 A1 | 8/2006 | Barnes |
| 2006/0200487 A1 | 9/2006 | Adelman |
| 2006/0212707 A1 | 9/2006 | Cahill |
| 2006/0212931 A1* | 9/2006 | Shull .................. G06F 21/55 726/10 |
| 2006/0235810 A1 | 10/2006 | Wen |
| 2006/0242026 A1 | 10/2006 | Crespo |
| 2006/0248076 A1 | 11/2006 | Troy |
| 2006/0253458 A1 | 11/2006 | Dixon |
| 2006/0253582 A1 | 11/2006 | Dixon |
| 2006/0294086 A1 | 12/2006 | Rose |
| 2006/0294134 A1 | 12/2006 | Berkhim |
| 2007/0027819 A1 | 2/2007 | Cowburn |
| 2007/0028107 A1 | 2/2007 | Cowburn |
| 2007/0078936 A1 | 4/2007 | Quinlan |
| 2007/0112761 A1 | 5/2007 | Xu |
| 2007/0124432 A1 | 5/2007 | Holtzman |
| 2007/0174247 A1 | 7/2007 | Xu |
| 2007/0174471 A1 | 7/2007 | Van Rossum |
| 2007/0214096 A1 | 9/2007 | Newman |
| 2008/0005064 A1 | 1/2008 | Sarukkai |
| 2008/0052633 A1 | 2/2008 | Kubo |
| 2008/0114709 A1 | 5/2008 | Dixon |
| 2008/0183695 A1 | 7/2008 | Jadhav |
| 2009/0062136 A1 | 3/2009 | Young |
| 2009/0307213 A1 | 12/2009 | Deng |
| 2010/0082618 A1 | 4/2010 | Ott |
| 2011/0040768 A1 | 2/2011 | Shon |
| 2011/0246484 A1 | 10/2011 | Dumais |

OTHER PUBLICATIONS

"DiSigncryption: An Integration of Agent-based Signature Delegation with Distributed Reputation Management Scheme"—P. Bamasak, N. Zhang and D. Edwards—IEEE 32005, pp. 1-8.

"How to Make Secure Email Easier to Use"—Garfinkel, David Margrave, Jeffrey I. Schiller, Erik Nordlander and Robert C. Miller—CHI ACM Apr. 2-7, 2005, pp. 1-11.

"Target dependent score normalization techniques and their application to signature verification" J. Fierrez-Aguilar, J. Orgega Garcia-Rodriguez—Systems, Many and Cybernetics, IEEE—Aug. 2005, pp. 418-425.

Epinions.com, Way8ackMachine—2004 (http://web.archive.org/web/20041013122547/www.epinions.com/Movies), (http://web.archive.org/web/20041211104641/www.epinions.com/,vie_mu-1131678/display_~reviews) , (http://web.archive.org/web/2004121025754/www.epinions.com/Movies-Foreign_films).

Google Directory Search, Feb. 1, 2004 (http://web.archive.Org/web/20040201210740/http://www.google.com/dlrhp ).

Guha, Open Rating Systems, WayBackMachine—Mar. 22, 2005, (http://www.web.archive.org/web/20050322033341/http://www.w3.org/2001/sw/Europe/events/foaf-galway/papers/fp/open_rating_systems/wot.pdf ).

Gyongyi et al. Combating Web Spam with TrustRank, 2004, pp. 576-587, (http://portal.acm.org/citation.cfm?id=1316689.1316740&coll=&dl=).

Kamvar et al., "Exploiting the Block Structure of the Web for Computing PageRank," Stanford University (2003), 13 pages.

Lioy, et al. "Multiple Electronic Signatures on Multiple Documents" Proceedings of the 1st International Workshop on electronic Government and Commerce: Design, Modeling, Analysis and Security, EGCDMAS 2004.

Wu et al., "Topical TrustRank: Using Topicality to Combat Web Spam," Department of Computer Science & Engineering, Lehigh University (2006), 10 pages.

Yufeng, W., and Nakao, A., "Poisonedwater: An Improved Approach for Accurate Reputation Ranking in P2P Networks," Future Generation Computer Systems 26(2010) 1317-1326.

Ziegler, Cai-Nicholas, "Chapter 6: On Propogating Interpersonal Trust in Social Networks," Computing with Social Trust, Human-Computer Interaction Series, J. Golbeck, ed., Springer-Verlag, London, 2009, pp. 133-168.

Ziegler, C-N., Lausen, G., "Propagation Models for Trust and Distrust in Social Networks," Information Systems Frontiers, 7:4/5, 337-358, 2005.

International Search Report and Written Opinion for International Application No. PCT/US2006/030754, dated Nov. 17, 2006, 15 pages.

(56) References Cited

OTHER PUBLICATIONS

Office Action issued in U.S. Appl. No. 11/382,449 dated Apr. 28, 2008, 36 pages.
Office Action issued in U.S. Appl. No. 11/382,449 dated Dec. 12, 2008, 15 pages.
Notice of Allowance issued in U.S. Appl. No. 11/382,449 dated Jun. 3, 2009, 8 pages.
Office Action issued in U.S. Appl. No. 12/552,956 dated May 23, 2011, 20 pages.
Office Action issued in U.S. Appl. No. 12/552,956 dated Nov. 11, 2011, 48 pages.
Notice of Allowance issued in U.S. Appl. No. 12/552,956 dated Sep. 4, 2012, 14 pages.
Office Action issued in U.S. Appl. No. 13/614,339 dated Jul. 2, 2013, 24 pages.
Office Action issued in U.S. Appl. No. 13/614,339 dated Jan. 13, 2014.
Notice of Allowance issued in U.S. Appl. No. 13/614,339 dated Apr. 16, 2014, 6 pages.

* cited by examiner

SEARCH RESULT RANKING BASED ON TRUST

This application is a continuation of U.S. patent application Ser. No. 13/614,339, filed on Sep. 13, 2012, which is a continuation of U.S. patent application Ser. No. 12/552,956, filed on Sep. 2, 2009, which is a continuation of U.S. patent application Ser. No. 11/382,449, filed May 9, 2006, now U.S. Pat. No. 7,603,350. The contents of U.S. patent application Ser. No. 14/552,956 and U.S. patent application Ser. No. 11/382,449 are incorporated herein by reference in their entirety.

FIELD OF THE INVENTION

The present invention relates to search engines, and more specifically to search engines that use information indicative of trust relationship between users to rank search results.

BACKGROUND OF THE INVENTION

The development of information retrieval systems has predominantly focused on improving the overall quality of the search results presented to the user. The quality of the results has typically been measured in terms of precision, recall, or other quantifiable measures of performance. Information retrieval systems, or 'search engines' in the context of the Internet and World Wide Web, use a wide variety of techniques to improve the quality and usefulness of the search results. These techniques address every possible aspect of search engine design, from the basic indexing algorithms and document representation, through query analysis and modification, to relevance ranking and result presentation, methodologies too numerous to fully catalog here.

An inherent problem in the design of search engines is that the relevance of search results to a particular user depends on factors that are highly dependent on the user's intent in conducting the search—that is why they are conducting the search—as well as the user's circumstances, the facts pertaining to the user's information need. Thus, given the same query by two different users, a given set of search results can be relevant to one user and irrelevant to another, entirely because of the different intent and information needs. Most attempts at solving the problem of inferring a user's intent typically depend on relatively weak indicators, such as static user preferences, or predefined methods of query reformulation that are nothing more than educated guesses about what the user is interested in based on the query terms. Approaches such as these cannot fully capture user intent because such intent is itself highly variable and dependent on numerous situational facts that cannot be extrapolated from typical query terms.

In part because of the inability of contemporary search engines to consistently find information that satisfies the user's information need, and not merely the user's query terms, users frequently turn to websites that offer additional analysis or understanding of content available on the Internet. For the purposes of discussion these sites are called vertical knowledge sites. Some vertical knowledge websites, typically community sites for users of shared interests, allow users to link to content on the Internet and provide labels or tags describing the content. For example, a site may enable a user to link to the website of an automobile manufacturer, and post comment or description about a particular car being offered by the manufacturer; similarly, such a site could enable a user to link to a news report on the website of a news organization and post comment about the report. These and other vertical knowledge sites may also host the analysis and comments of experts or others with knowledge, expertise, or a point of view in particular fields, who again can comment on content found on the Internet. For example, a website operated by a digital camera expert and devoted to digital cameras typically includes product reviews, guidance on how to purchase a digital camera, as well as links to camera manufacturer's sites, new products announcements, technical articles, additional reviews, or other sources of content. To assist the user, the expert may include comments on the linked content, such as labeling a particular technical article as "expert level," or a particular review as "negative professional review," or a new product announcement as "new 10MP digital SLR". A user interested in a particular point of view, type of information, or the like then search within the domain of such a site for articles or links that have certain associated labels or comments. For example, a user could search the aforementioned digital camera site for all camera reviews labeled "digital SLR".

One of the underlying aspects of vertical knowledge sites that makes them appealing to users is that some of the users who participate on them come to be perceived as being trustworthy in their comments, analysis, opinions and recommendations. This degree of trust is valuable to users as a way of evaluating the often bewildering array of information that is available on the Internet. Indeed, many popular vertical knowledge sites, blogs, news outlets, so forth, are primarily devoted to facilitating dissemination of the opinions of individual experts or commentators, while other vertical knowledge sites such as forums, rating sites, and community sites operate to share and disseminate the opinions of many users in a community. In either case, many users access these sites because of an underlying sense of trust in at least some of the others users who are providing their opinions. Of course, in some cases a particular user's (or author's) views may not be trusted by others. For example, on most forums there will be one or more users who are viewed by others as being uninformed, biased, hostile or otherwise not trustworthy. Particularly for new users, identifying which other members of a community are trustworthy and which are not can be a difficult and time consuming process.

Some vertical knowledge sites now provide various types of indicators or proxies for the trustworthiness of particular individuals who participate at the site. Auction sites use rating systems to identify trusted buyers and sellers. Forum sites use membership criteria and other factors to distinguish between posters. But many sites simply rely on general reputation of their experts to instill a sense of trust in users who visit the site. Thus, at best a user can currently search within the context or domain of a particular website for comments, opinions or the like made by individuals who are trusted by the user or by others.

The problem remains that when the user returns to a general search engine, outside of the vertical knowledge site, the user is unable to obtain search results that reflect the trustworthiness of the documents themselves or the trustworthiness of any commentary or opinions that may be associated with the search result documents. Thus, none of the additional reputation based information that is associated with users in the vertical knowledge site is available to the general search engine in order to provide more meaningful search results to other users.

SUMMARY

A search engine system provides search results that are ranked according to a measure of the trust associated with entities that have provided labels for the documents in the search results. The system maintains information describing annotations provided by any of the entities. An entity creates an annotation for a particular item (or collection) of web content as a way of associating a label with a particular item of web content, such as a web page. For example, an entity such as a digital camera expert operating a website devoted to digital cameras, may create an annotation associating the label "professional review" with a particular review of a digital camera on some third party site (e.g., on the site of a news publication). In addition, the system maintains information about trust relationships between entities, such as individual users, indicating whether (or the degree to which) one entity trusts another entity. Thus, users can indicate whether or the extent to which they trust the digital camera expert. The system can determine a trust rank for any particular entity, based on the trust relationships between the various entities.

A user provides a query to the system; the query contains at least one query term and optionally includes one or more labels of interest to the user. The system retrieves a set of search results comprising documents that are relevant to the query term(s). The system determines which query labels are applicable to which of the search result documents. The system determines for each document an overall trust factor to apply to the document based on the trust ranks of those entities that provided the labels that match the query labels. Applying the trust factor to the document adjusts the document's information retrieval score, to provide a trust adjusted information retrieval score. The system reranks the search result documents based at on the trust adjusted information retrieval scores.

The present invention has various embodiments, including as a computer implemented process, as computer apparatuses, as integrated circuits, and as computer program products that execute on general or special purpose processors.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the illustrated and described structures, methods, and functions may be employed without departing from the principles of the invention.

DETAILED DESCRIPTION

System Overview

Figure 1:
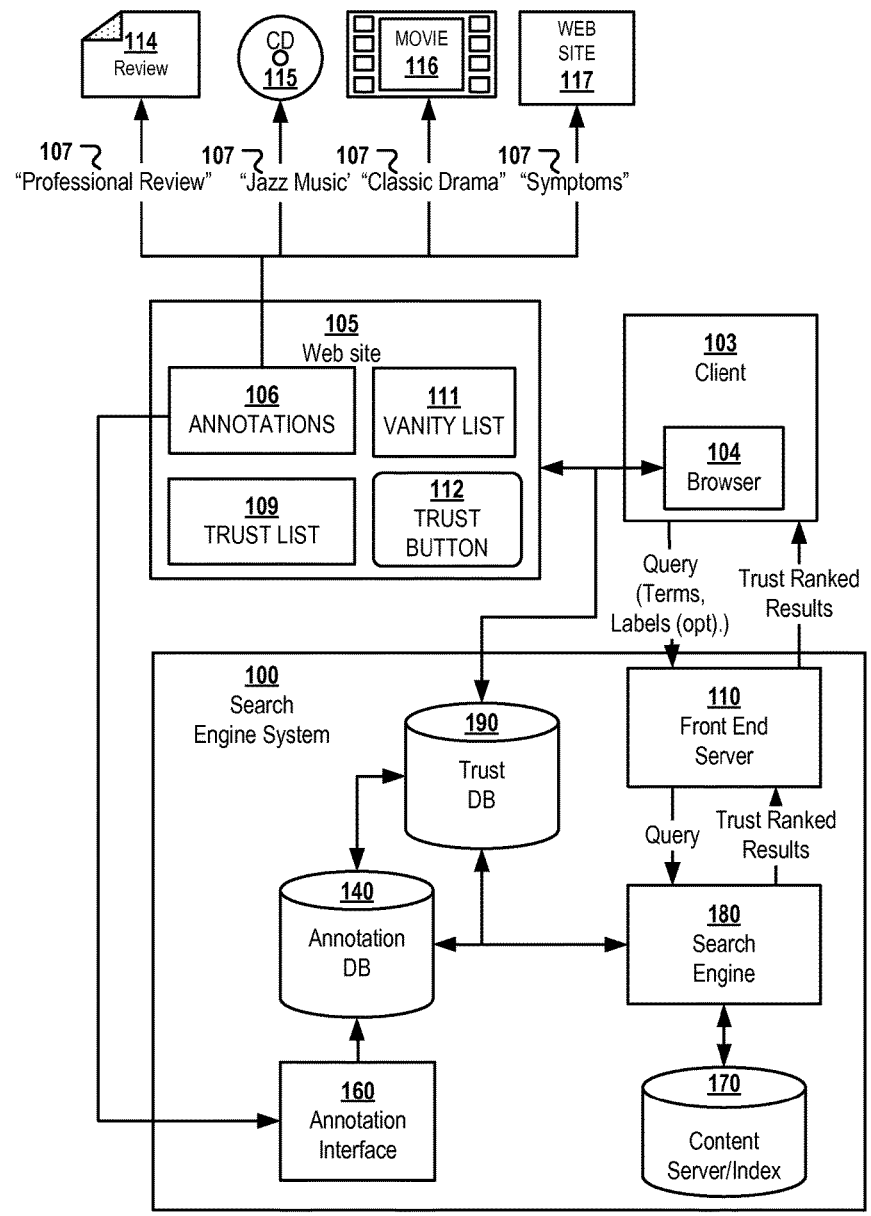
FIG. 1 illustrates a generalized system architecture for a search engine system in accordance with one embodiment.

FIG. 1 presents a diagram illustrating a system that ranks search results using trust in accordance with an embodiment of the present invention. Referring to FIG. 1, a user operates a browser 104 located on a client 103. Client 103 can generally include any node on a network including computational capability and including a mechanism for communicating across the network. The client 103 can be any type of client, including any type of computer (e.g., desktop computer, workstation, notebook, mainframe, terminal, etc.), handheld device (personal digital assistant, cellular phone, etc.), or the like. The client device 103 need only have the capability to communicate over a network (e.g. Internet, telephony, LAN, WAN, or combination thereof) with the search engine system 100. Typically, a client device 103 will also support appropriate networking applications and components, all of which are known to those of skill in the art.

Browser 104 can generally include any type of web browser capable of viewing a web site, such as the INTERNET EXPLORER™ browser distributed by the Microsoft Corporation of Redmond, Wash. Search engine system 100 can generally include any computational node including a mechanism for servicing queries from a client for computational and/or data storage resources. Note that the code and data involved in processing queries typically resides within a memory within search engine system 100. Copies of the code and data can also reside within non-volatile storage which is included in the system 100. The figure does not show a number of conventional components (e.g. network, firewalls, routers, domain name servers, load balancers, etc.) in order to not obscure the relevant details of the embodiment.

During operation, a user's client 103 can communicate with search engine system 100 to search for documents relevant to a query. A query generally comprises one or more query terms and optionally includes one or more labels. Query terms are words that the user believes are relevant to the user's information need; labels are words, phrases, markers or other indicia that have been associated with certain web content (pages, sites, documents, media, etc.) by others as descriptive or categorical identifiers. For example, a query "cancer label:symptoms" includes the query term "cancel" and a query label "symptoms", and thus is a request for documents relevant to cancer, and that have been labeled as relating to "symptoms." Labels such as these can be associated with documents from any entity, whether the entity created the document, or is a third party. The entity that has labeled a document has some degree of trust, as further described below.

The browser 104 can also access any web site available on the network (not shown) belonging to a person, or any another type of entity such as a company, enterprise, community group, and so forth. For example, in FIG. 1 browser 104 accesses Expert's web site 105, which is hosted by a third-party server, or alternatively by the a server associated with the search engine system 100. Expert's web site 105 can generally be any type of web content provided by Expert. For example, Expert's web site 105 can include Expert's personal home page, along with pages directed towards Expert's interests, as well as Expert's blog, an e-commerce storefront for goods that Expert sells, and so forth. In addition, Expert's site 105 can include pages containing links to other sites (including entire sites, portions of a site, or individual pages) along with annotations 106 associated with such linked content. An annotation 106 includes a label 107 and a URL pattern associated with the label; the URL pattern can be specific to an individual web page or to any portion of a web site or pages therein. The term "document" is used herein to refer to any and all types of content that can be accessed by a client over a network.

For example, Expert may create an annotation 106 including the label 107 "Professional review" for a review 114 of Canon digital SLR camera on a web site "www.digitalcameraworld.com", a label 107 of "Jazz music" for a CD 115 on the site "www.jazzworld.com", a label 107 of "Classic Drama" for the movie 116 "North by Northwest" listed on website "www.movierental.com", and a label 107 of "Symptoms" for a group of pages describing the symptoms of colon cancer on a website 117 "www.yourhealth.com". Note that labels 107 can also include numerical values (not shown), indicating a rating or degree of significance that the entity attaches to the labeled document.

Expert's web site 105 can also include trust information. More specifically, Expert's web site 105 can include a trust list 109 of entities whom Expert trusts. This list may be in the form of a list of entity names, the URLs of such entities' web pages, or by other identifying information. Expert's web site 105 may also include a vanity list 111 listing entities who trust Expert; again this may be in the form of a list of entity names, URLs, or other identifying information. The trust list 109 and vanity list 111 may be encoded in any computer readable form supported by Expert's website. An "entity" may be a specific person, group, organization, website, business, institution, government agency or the like.

In one embodiment of the present invention, a web crawler (not shown) obtains labels and trust information and sends it to search engine system 100 to facilitate subsequent usage in search result ranking. This process is described in more detail below with reference to FIGS. 2-4.

Expert's web site 105 can also include a "trust button" 112. A user visiting Expert's web site can click on trust button 112 to cause a corresponding trust relationship to be recorded at the search engine system 100. This trust relationship indicates that the user trusts Expert, and may be understood as well to indicate that the user trusts the labels that Expert has provided for various documents and site. Note that if Expert's web site 105 is provided by a third-party server, the trust button 112 can be implemented as an inline frame (iframe) provided by such server, which examines a cookie to identify user and then provides an identifier for the user and an identifier for Expert to the search engine system 100. When accessed, the search engine system 100 receives information indicative of the trust relationship between the user and Expert. This information may take the form of a tuple of data <entity1, entity2, trust_value> identifying the trusting entity, the trusted entity, and a trust value. For example, the tuple <3365, 1230, 1> indicates that the entity (e.g., a user) with the identifier 3365 trusts the entity with the identifier 1230 (e.g., Expert) with a trust value of 1. The trust information is stored in a trust database 190.

In one embodiment, a user can have different levels of trust in an entity for different topics. For example, a user may trust an entity with respect to politics and economics, but not with respect to sports and entertainment. The trust information tuple can thus be extended as <entity1, entity2, topic, trust_value>, where topic identifies the particular topic for which entity1 trusts entity2 (the topic can be identified by a text string, a topic identifier, or other means). The user manifestation of topic based trust can vary. For example, the trust button 112 can be linked to a further selection or list of topics. For a trust list, the user can include a list of the trusted topics for each entity he or she trusts. The trust information provided by the users with respect to others is used to determine a trust rank for each user, which is measure of the overall degree of trust that users have in the particular entity.

In order to obtain search results, user's client 103 sends a search query the search engine system 100, which is received by a front end server 110. The front end server 110 is adapted to receive a query from the client 102 and pass it to the query processor 120, and then subsequently receive the search results back from the query processor 120 and provide them to the client 102. The front end server 110 is further adapted to handle the queries from multiple different clients 102 concurrently.

The front end server 110 passes the query to the search engine 180, which processes a user's query (using a content server and index 170) to obtain a set of search results that are relevant to the query term(s). Where the query includes labels (as these are optional), the search engine 180 accesses an annotation database 140 to determine which of the documents in the search results have one or more of the query labels associated with them. Using the annotation information and trust information from the trust database 190, the search engine 180 determines a trust factor for each document. A document's trust factor is a function of the trust ranks associated with the entities have labeled the document with labels that match the query labels. The search engine 180 adjusts each document's underlying information retrieval score using the document's trust factor, and then reranks the search results using the adjusted scores. The trust adjusted search results are returned to the front end server 110, which passes them to the client 103.

Figure 5:
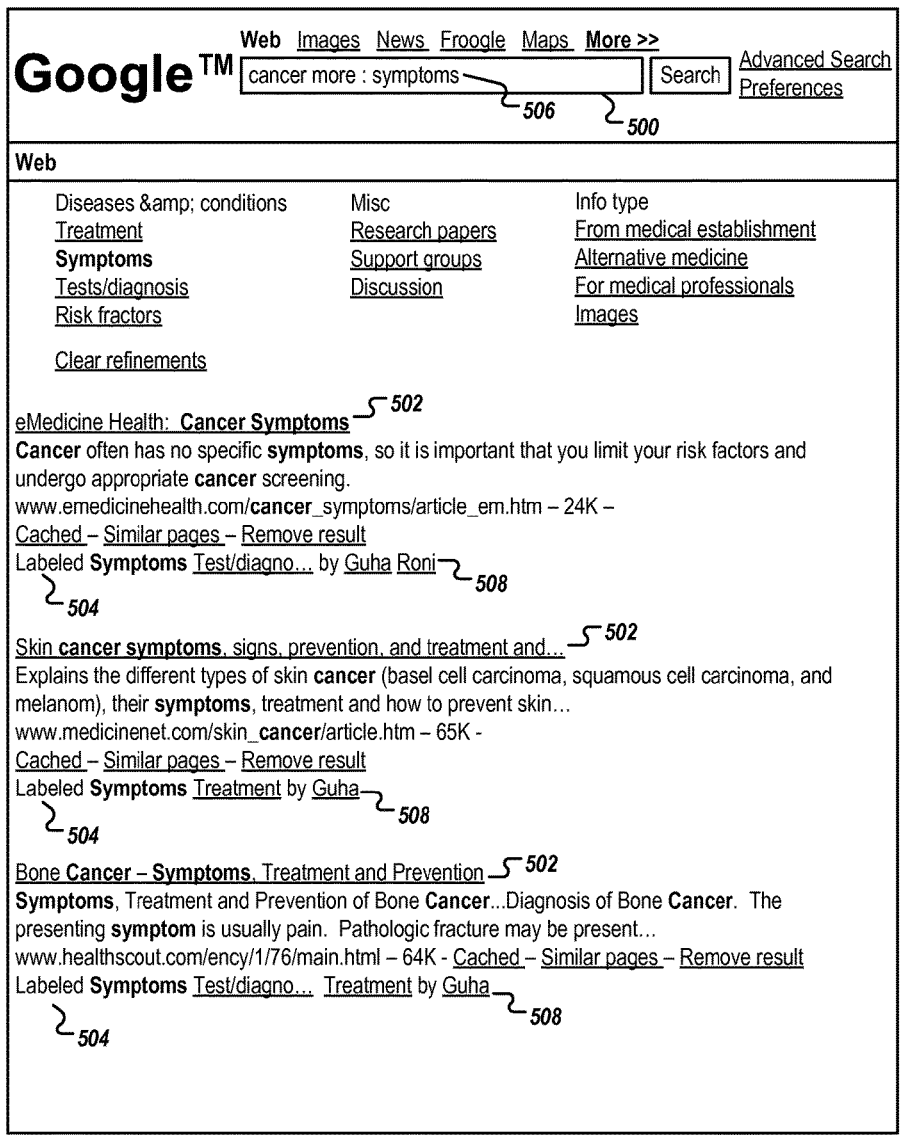
FIG. 5 illustrates an example of search query including a label and corresponding search results.

FIG. 5 illustrates an example of search query including a label and corresponding search results. Search query field 506 is shown including a search query 500 that include the query term "cancer" and the indicated label "symptoms." This query has been provided to the search engine system 100, and some of the search results 502 (a set of documents) as shown in trust-adjusted ranked order. Of interest in each search result 502 (document) is the indicia of the matching label 504 "symptom" for each shown search result, as well as other labels 504 such as "Tests/diagnosis,", and "Treatment." Also shown next to each result is the name 508 of the entity that provided the matching label, here the user named Guha; the name 508 of another user Roni, is also shown on one of the results. The results are listed in an order based on the trust ranks of the entities 508 which have provided the labels 504 that match the query label of "symptoms." Thus, the user can determine the quality and significance of each search result in part by seeing which entities have provided the labels that match the query labels.

Obtaining and Storing Trust Information

Figure 2:
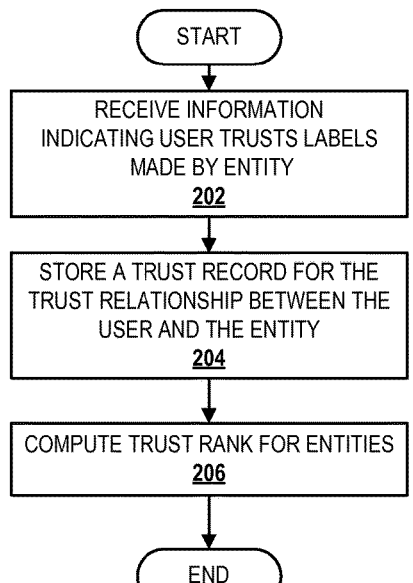
FIG. 2 is a flowchart of a method for collecting trust information.

FIG. 2 presents a flowchart illustrating the process of obtaining and storing trust information in accordance with an embodiment of the present invention; other variations of the steps or procedures of this process can be readily developed to achieve the same results.

During this process, the system 100 receives 202 information indicating that the user trusts labels provided by the entity. This can involve receiving this information directly from the user. For example, the user can click on a "trust button" on a web page belonging to the entity, which causes a corresponding record for a trust relationship to be recorded in the trust database 190. In general any type of input from the user indicating that such as trust relationship exists can be used.

As indicated above, the system can also use a web crawler to examine web pages to locate information indicating that which user trusts a particular entity. While examining web pages, the web crawler can look for a number of relationships, including: (1) links from the user's web page to web pages belonging to trusted entities; (2) a trust list that identifies entities that the user trusts; or (3) a vanity list which identifies users who trust the owner of the vanity page.

The system can also examine web visitation patterns of the user and can infer from the web visitation patterns which entities the user trusts. For example, the system can infer that a particular user trust a particular entity when the user visits the entity's web page with a certain frequency.

The search engine system 100 can also examine computer-based records belonging to the user, such as an email contact list or an instant-messaging chat list, and can infer from these computer-based records that the user trusts entities included in such contact or chat lists. More particular, for each entity included in the user's contact/chat list, a trust record indicating a trust relationship between the user and entity can be entered in the trust database 190. Alternatively, a user may specifically mark or identify entities in the user's contact or instant messaging list as being trusted, or with a particular degree of trust, or trusted topics.

The search engine system 100 can also infer trust transitively, by assigning a trust value between a user and first entity, where the user directly trusts a second entity, and the second entity in turn trusts the first entity.

Next, the search engine system 100 stores 204 a corresponding record for the trust relationship between the user and the entity in the trust database 190 to facilitate subsequent data retrieval operations. The trust database 190 can include any type of data structure or database system that can facilitate data retrieval of trust information.

In one embodiment, the trust information in the trust database 190 is stored in a square trust matrix M, where each matrix value $M_{ij}$ stores a value indicative of entity i's trust of entity j. As noted above, in one embodiment, the trust value is 0 or 1, though other values or ranges of values can be used. The matrix information can be stored in any suitable storage structure, including tables, arrays, bit maps, trees, or the like.

For each entity i, a trust rank $TR_i$ can be computed 206 from the trust matrix M. The $TR_i$ of entity i is the $i^{th}$ component of the eigenvector of TR that is associated with the eigenvalue of 1. Where trust information includes topic information, a separate trust matrix M is constructed for each topic t and a topic-specific trust rank $TR_{i,t}$ is computed. The topic matrices can be aggregated at various levels according to topical hierarchies, and aggregated topic-specific trust ranks may also be computed therefrom. While FIG. 2 shows the computation 206 of trust rank following storing 204, these steps need not occur in this order, and in one embodiment, the computation 206 of trust rank is executed in an independent process.

Note that trust relationships can change. For example, the system can increase (or decrease) the strength of a trust relationship for a trusted entity. The search engine system 100 can also cause the strength of a trust relationship to decay over time if the trust relationship is not affirmed by the user, for example by visiting the entity's web site and activating the trust button 112. The search engine system 100 may also expose a user interface to the trust database 190 by which the user can edit the user trust relationships, including adding or removing trust relationships with selected entities.

The trust information in the trust database 190 is also periodically updated by crawling of web sites, including sites of entities with trust information (e.g., trust lists, vanity lists); trust ranks are recomputed based on the updated trust information.

Obtaining and Storing Label Information

Figure 3:
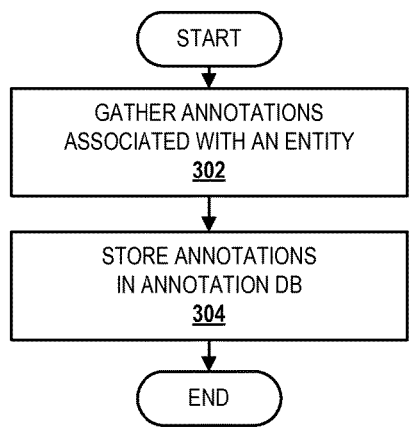
FIG. 3 is a flowchart of a method for collecting annotation information.

FIG. 3 presents a flowchart illustrating the process of obtaining and storing annotations (including labels) on web content in accordance with an embodiment of the present invention; other variations of the steps or procedures of this process can be readily developed to achieve the same results.

During this process, the system gathers 302 annotations 106 associated with an entity. This can involve using a web crawler to examine web pages associated with the entity to identify annotations 106 created by the entity. One system and methodology for analysis of annotations provided by entities is described in U.S. application Ser. No. 11/202,423, filed on Aug. 10, 2005 and entitled "Programmable Search Engine", which is incorporated by reference herein.

The system can also receive annotations 106 from an entity via an annotation interface 160 that is configured receive annotation files. An annotation file contains annotations. As indicated previously, an annotation includes a pattern for a uniform resource locator (URL) for the URLs of documents, and a label to be applied to a document whose URL matches the URL pattern. Schematically, an annotation may take the form:

<label, URLpattern> where label is a term or phrase, and URLpattern is a specification of a pattern for a URL.

For example, the annotation

<"professional review", www.digitalcameraworld.com/review> would be used to apply the label "professional review" to any document whose URL includes a URL prefix matching the network location "www.digitalcameraworld.com/review/"; all documents in this particular host's directory are considered by the entity providing the annotation to be "professional reviews" of digital cameras. In one embodiment, the URL pattern can include wildcards as well as regular expressions. In a typical embodiment, the annotation database 104 includes thousands, even millions of such annotations. There is a many-to-many relationship between labels and URL patterns, in that a given label may be applied to any document matching multiple different URL patterns, and a given URL pattern may be associated with many different labels.

From the received annotation information, the system stores the annotations in the annotation database 140. The annotation database 140 includes an inverted index (or equivalent) that indexes each annotation to whatever URL patterns have been defined for it (whether by the same or different entities). In some cases, an entity may simply create a link from its site to a particular item of web content (e.g., a document) and provide a label 107 as the anchor text of the link. In this case, a crawler extracts the label from the link and generates the appropriate annotation by using the label and the associated URL of the linked content. Each annotation is associated with the entity that provided the annotation. The trust rank TR for the associated entity can thereby be accessed as follows. First, given a document identifier (e.g., a URL), the annotations 106 associated with the document can be determined from the annotation database 140. For each identified annotation, the entity that provided the annotation can be determined, and that entity's trust rank TR retrieved from the trust database 190.

The search engine system 100 periodically updates the annotation database 140 by crawling web sites and extracting annotations therein, as well as receiving annotation files via the annotation interface 160.

Generated Trust Ranked Search Results

Figure 4:
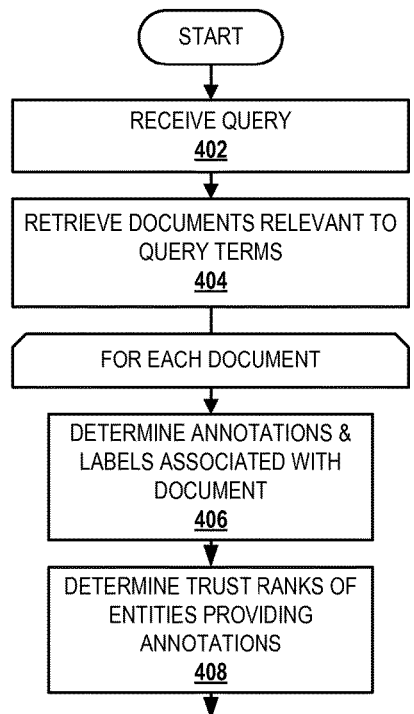
FIG. 4 is a flowchart of a method for processing search results with trust ranks.

FIG. 4 presents a flowchart illustrating one process of generating trust ranked search results in accordance with an embodiment of the present invention; other variations of the steps or procedures of this process can be readily developed to achieve the same results.

The front end server 110 receives 402 a query from a user. The query includes at least one query term, and optionally includes one or more labels, as described above. The query is provided to the search engine 180.

For example, a query may be digital camera more: professional review where the terms "digital camera" are the query terms, and the token "label:" indicates that the following term is a label of interest. Thus, in this example, the user is searching for documents that have been labeled (by one or more individuals, such as other users, experts, etc.) as being professional reviews of digital cameras.

Another example would be the query abortion label:statistics label:pro-choice.

In this example, the user would be searching for documents that relevant to abortion and had been labeled as either statistics or pro-choice related. The particular syntax used to indicate labels (as differentiated from query terms) is not limited to the use of "label:" and other tokens and formats can be used as well. For example, the query can take the form such as abortion label:(statistics pro-choice)

where the terms in the parenthetical label are the labels of interest (as disjuncts).

The front end server 110 (or other module) includes a parser that performs the initial parsing of the query into query term and labels.

The search engine 180 retrieves 404 a set of documents that are relevant to the query term(s). The search engine 180 can use any type of information retrieval model for selecting and scoring relevant documents. One suitable information retrieval model is a link-based model, such as PageRank which is described in U.S. Pat. No. 6,285,999, and incorporated by reference herein.

The retrieved documents are ranked ordered in terms of an underlying (base) information retrieval score used by the search engine 180. For each document, the labels associated with the document are determined 406 from the annotation database 140 by matching the URL of the document to the URL patterns in the annotations. Thus, if the URL of a particular search result document matches the three different annotations for three different labels, each of these labels will be determined as associated with the document.

The query labels are then matched against the retrieved annotation labels, to identify which query labels apply to the document; this can be done by matching the query labels to the document's annotated labels. For each such annotation label matching a query label, the trust rank TR of entity that provided the annotation label is retrieved 408. A document may have been labeled with the same label by several different entities. For example, three different entities may have labeled a particular review of digital camera with the label "professional review" while a fourth labeled the same review with the label "negative review." If the query label included "professional review" then only the first three annotation labels would be deemed matched. It should be noted that steps 406 and 408 can performed in batch against all the search results, or iteratively for each search result, depending the desired programming model.

The trust ranks of the entities associated with the matching labels are aggregated 410 to create an aggregated trust rank. Thus, in this example, the trust ranks of the three different experts would be aggregated into a single trust rank associated with the particular label "professional review" for the review document. This aggregation is performed for each label associated with the document.

For example, assume that a particular document, such as a review of a Casio digital camera, has the following annotations associated therewith:

| Label | Entity | Trust Rank |
|---|---|---|
| "Professional Review" | Phil Photo | 8 |
| "Professional Review" | Earl Expert | 6 |
| "Professional Review" | Chris Click | 7 |
| "Digital SLR" | Phil Photo | 8 |
| "Digital SLR" | Eddy Shooter | 2 |
| "Best buy" | Betsy Buyer | 3 |

The trust ranks of the entities could be aggregated with respect to these labels. The trust ranks can be aggregated using a weighting function. Aggregation using a linear weighting function would be:

| Label | Linear Aggregated Trust Rank |
|---|---|
| "Professional Review" | 21 |
| "Digital SLR" | 10 |
| "Best buy" | 3 |

This approach basically applies a fixed trust weight (e.g., 1) to the trust ranks prior to summing them.

The trust ranks TR can be aggregated in a number of different ways other than linear weighting. One variation is an asymptotic weighting function. For example, one approach here would be to sum the log of the trust ranks to form the aggregated trust rank. Another variation of the weighting function is to apply a weight that decays with the increasing number of instances of a particular label. For example, the trust ranks can be ordered by age of the associated annotation, and weighted to decrease (alternatively increase) the weight applied to the trust rank for the oldest annotation. Another way in which the trust ranks can be aggregated is by use of a sigmoid weighting function.

The foregoing are various examples of different ways that trust ranks can be aggregated; other way of combining the trust ranks of individual entities can be readily implemented, and these too are deemed to come within the concept of aggregation.

Once the trust ranks have been aggregated for each label that matches a query label, the aggregated trust ranks are applied 412 to the document's base information retrieval score. The aggregated trust ranks can be combined into a trust factor, using any type of aggregation function. For example, trust factor can be the sum total of the aggregated trust ranks Second, the aggregated trust ranks can be aggregated asymptotically or via a sigmoid function to form the trust factor.

However the trust factor is determined from the aggregated trust ranks, it is then applied to the base information retrieval score, for example by multiplying with the trust factor. Other ways of applying the trust factor to the base information retrieval score as also possible. The resulting score is said to be trust-adjusted information retrieval score.

After (or as) the trust-adjusted information retrieval scores have been determined, the search engine 180 reranks 414 the search results by these adjusted scores. The result set is returned to the front end server 110, which in turn passes it to the client 103. The user can then review the search results.

The search engine system 100 is adapted to receive queries that do not include labels, and still provide trust based ranking. In this case, if certain annotations are applicable to a search result document, then the trust rank for the entities providing these annotations is retrieved, aggregated, and applied to the base information retrieval score of the document as well, and the documents are reranked accordingly.

In discussion of the various embodiments, examples have been discussed using search queries including a single query term and a single label, as well as examples referencing individual documents. It is understood that the embodiments and invention are not so limited, and should be generally understood as equally operable with queries including a plurality of query terms and a plurality of labels. Thus any reference herein, including in the claims below, to various words in the singular noun form, such as query term, label, annotation, document, and so forth, are not intended to be limited to the singular, but should be read as including at least one or a plurality thereof, unless such a construction is expressly indicated as not intended or appropriate for the circumstances.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention have been described using commands, mnemonics, tokens, formats, syntax, and other programming conventions. The particular selection of the names, formats, syntax, and the like are merely illustrative, and not limiting. Those of skill in the art can readily construct alterative names, formats, syntax rules, and so forth for defining context files and programming the operations a programmable search engine via context processing.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer-implemented method comprising:
   providing, for display at a first computing device, a user interface associated with a particular entity, the user interface comprising (i) an interactive control configured to instruct a second computing device to assign a score in response to user interaction with the interactive control and (ii) an interface for the user to indicate topics for the particular entity, the interface indicating a plurality of topics corresponding to the interactive control;
   receiving data indicating (i) user interaction with the interactive control by a user and (ii) one or more topics selected by the user from among the plurality of topics corresponding to the interactive control;

in response to receiving the data indicating (i) user interaction with the interactive control by the user and (ii) the one or more topics selected by the user from among the plurality of topics corresponding to the interactive control, sending, over a network, data that indicates the one or more topics that were selected by the user from among the plurality of topics corresponding to the interactive control, wherein the data causes the second computing device to assign a score for the user with respect to the particular entity for the one or more topics, the score indicating, to a search engine, a degree that content that is (i) associated with the particular entity and (ii) related to the one or more topics is relied on by the search engine to generate search results in response to queries from the user;

in response to a query from the user, obtaining a set of search results for the query, the set of search results being ranked by the search engine based at least in part on the score for the user with respect to the particular entity for the one or more topics that were selected by the user from among the plurality of topics corresponding to the interactive control, wherein the set of search results comprises search results that each reference a document for which annotation text has been submitted by one or more entities, and wherein the search results are ranked based on the annotation text and scores for the user with respect to the one or more entities; and providing the set of search results ranked by the search engine based at least in part on the score for the user with respect to the particular entity for the one or more topics that were selected by the user from among the plurality of topics corresponding to the interactive control.

2. The method of claim 1, wherein sending the data that indicates the one or more topics that were selected by the user from among the plurality of topics corresponding to the interactive control, wherein the data causes the second computing device to assign a score comprises sending data identifying the user.

3. The method of claim 2, wherein providing the user interface comprises displaying, at the first computing device, a web page associated with the particular entity, the web page including an interactive button; and wherein sending the data that indicates the one or more topics that were selected by the user from among the plurality of topics corresponding to the interactive control, wherein the data causes the second computing device to assign the score comprises sending data instructing the second computing device to record a score for the user with respect to the particular entity.

4. The method of claim 3, wherein displaying the web page comprises displaying a web page including a list indicating a set of entities having a predetermined relationship with the particular entity.

5. The method of claim 4, wherein the list includes a list of names of the entities in the set or a list of web pages for the entities in the set.

6. The method of claim 1, wherein sending the data that indicates the one or more topics that were selected by the user from among the plurality of topics corresponding to the interactive control, wherein the data causes the second computing device to assign the score comprises sending data instructing the second computing device to assign a score that causes multiple annotations provided by the particular entity to be used in identifying search results for queries submitted by the user.

7. The method of claim 6, wherein providing the set of search results comprises providing a set of search results that is ranked based on the identity of the user, the search results including search results for documents annotated by other users and being ranked using topic-specific scores that are combined according to a predetermined weighting function.

8. The method of claim 1, further comprising receiving, through the interface, user input indicating a value; and wherein sending data that indicates the one or more topics that were selected by the user from among the plurality of topics corresponding to the interactive control, wherein the data causes the second computing device to assign the score comprises sending data instructing the second computing device to assign a score corresponding to the value indicated by the user input.

9. The method of claim 1, further comprising storing the score based on receiving the data indicating the user interaction with the interactive control.

10. The method of claim 1, wherein sending the data comprises sending data instructing a new relationship to be established between the user and a particular other user.

11. The method of claim 1, wherein providing the set of search results generated by the search engine based at least in part on the score comprises:

providing a set of search results referring to one or more documents to which the particular entity applied an annotation, wherein one or more terms of the query match one or more terms of the annotation applied by the particular entity.

12. The method of claim 1, wherein, before receiving the data indicating the user interaction with the interactive control, the second computing device stores a score for the user with respect to the particular entity, the score indicating a first of level of reliance by the search engine on annotations by the particular entity to determine search results for the user;

wherein receiving the data indicating the user interaction with the interactive control by the user comprises receiving data indicating user selection of a particular topic in the plurality of topics; and wherein sending the data that indicates the one or more topics that were selected by the user from among the plurality of topics corresponding to the interactive control, wherein the data causes the second computing device to assign a score comprises sending data instructing the second computing device to assign a score that increases a level of reliance by the search engine on annotations by the particular entity to determine search results for the user for the particular topic to a second level that is greater than the first level.

13. A system comprising:

one or more computers and one or more storage devices storing instructions that are operable, when executed by the one or more computers, to cause the one or more computers to perform operations comprising:

providing, for display at a first computing device, a user interface associated with a particular entity, the user interface comprising (i) an interactive control configured to instruct a second computing device to assign a score in response to user interaction with the interactive control and (ii) an interface for the user to indicate topics for the particular entity, the interface indicating a plurality of topics corresponding to the interactive control;

receiving data indicating (i) user interaction with the interactive control by a user and (ii) one or more topics selected by the user from among the plurality of topics corresponding to the interactive control;

in response to receiving the data indicating (i) user interaction with the interactive control by the user and (ii) the one or more topics selected by the user from among the plurality of topics corresponding to the interactive control, sending, over a network, data that indicates the one or more topics that were selected by the user from among the plurality of topics corresponding to the interactive control, wherein the data causes the second computing device to assign a score for the user with respect to the particular entity for the one or more topics, the score indicating, to a search engine, a degree that content that is (i) associated with the particular entity and (ii) related to the one or more topics is relied on by the search engine to generate search results in response to queries from the user;

in response to a query from the user, obtaining a set of search results for the query, the set of search results being ranked by the search engine based at least in part on the score for the user with respect to the particular entity for the one or more topics that were selected by the user from among the plurality of topics corresponding to the interactive control, wherein the set of search results comprises search results that each reference a document for which annotation text has been submitted by one or more entities, and wherein the search results are ranked based on the annotation text and scores for the user with respect to the one or more entities; and providing the set of search results ranked by the search engine based at least in part on the score for the user with respect to the particular entity for the one or more topics that were selected by the user from among the plurality of topics corresponding to the interactive control.

14. The system of claim 13, wherein sending the data that indicates the one or more topics that were selected by the user from among the plurality of topics corresponding to the interactive control, wherein the data causes the second computing device to assign a score comprises sending data identifying the user.

15. The system of claim 14, wherein providing the user interface comprises displaying, at the first computing device, a web page associated with the particular entity, the web page including an interactive button; and wherein sending the data that indicates the one or more topics that were selected by the user from among the plurality of topics corresponding to the interactive control, wherein the data causes the second computing device to assign the score comprises sending data instructing the second computing device to record a score for the user with respect to the particular entity.

16. The system of claim 13, wherein the operations further comprise receiving, through the interface, user input indicating a value; and wherein sending data that indicates the one or more topics that were selected by the user from among the plurality of topics corresponding to the interactive control, wherein the data causes the second computing device to assign the score comprises sending data instructing the second computing device to assign a score corresponding to the value indicated by the user input.

17. One or more non-transitory computer-readable media encoded with a computer program, the program comprising instructions that when executed by one or more computers cause the one or more computers to perform operations comprising:

providing, for display at a first computing device, a user interface associated with a particular entity, the user interface comprising (i) an interactive control configured to instruct a second computing device to assign a score in response to user interaction with the interactive control and (ii) an interface for the user to indicate topics for the particular entity, the interface indicating a plurality of topics corresponding to the interactive control;

receiving data indicating (i) user interaction with the interactive control by a user and (ii) one or more topics selected by the user from among the plurality of topics corresponding to the interactive control;

in response to receiving the data indicating (i) user interaction with the interactive control by the user and (ii) the one or more topics selected by the user from among the plurality of topics corresponding to the interactive control, sending, over a network, data that indicates the one or more topics that were selected by the user from among the plurality of topics corresponding to the interactive control, wherein the data causes the second computing device to assign a score for the user with respect to the particular entity for the one or more topics, the score indicating, to a search engine, a degree that content that is (i) associated with the particular entity and (ii) related to the one or more topics is relied on by the search engine to generate search results in response to queries from the user;

in response to a query from the user, obtaining a set of search results for the query, the set of search results being ranked by the search engine based at least in part on the score for the user with respect to the particular entity for the one or more topics that were selected by the user from among the plurality of topics corresponding to the interactive control, wherein the set of search results comprises search results that each reference a document for which annotation text has been submitted by one or more entities, and wherein the search results are ranked based on the annotation text and scores for the user with respect to the one or more entities; and providing the set of search results ranked by the search engine based at least in part on the score for the user with respect to the particular entity for the one or more topics that were selected by the user from among the plurality of topics corresponding to the interactive control.

18. The one or more non-transitory computer-readable media of claim 17, wherein sending the data that indicates the one or more topics that were selected by the user from among the plurality of topics corresponding to the interactive control, wherein the data causes the second computing device to assign a score comprises sending data identifying the user.

19. The non-transitory computer-readable medium of claim 18, wherein providing the user interface comprises displaying, at the first computing device, a web page associated with the particular entity, the web page including an interactive button; and wherein sending the data that indicates the one or more topics that were selected by the user from among the plurality of topics corresponding to the interactive control, wherein the data causes the second computing device to assign the score comprises sending data instructing the second computing device to record a score for the user with respect to the particular entity.

20. The non-transitory computer-readable medium of claim 17, wherein sending the data that indicates the one or more topics that were selected by the user from among the plurality of topics corresponding to the interactive control, wherein the data causes the second computing device to assign the score comprises sending data instructing the second computing device to assign a score that causes multiple annotations provided by the particular entity to be used in identifying search results for queries submitted by the user.

\* \* \* \* \*

UNITED STATES PATENT AND TRADEMARK OFFICE
CERTIFICATE OF CORRECTION

PATENT NO. : 10,268,641 B1
APPLICATION NO. : 14/445209
DATED : April 23, 2019
INVENTOR(S) : Guha Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this
Nineteenth Day of May, 2020

Andrei Iancu
*Director of the United States Patent and Trademark Office*